United States Patent Office 3,203,898
Patented Aug. 31, 1965

3,203,898
LUBRICATING COMPOSITIONS CONTAINING CONDENSATION POLYMERS OF CHLOROMETHYL AROMATICS
Edward E. Harris, Niagara Falls, N.Y., assignor to Olin Mathieson Chemical Corporation, a corporation of Virginia
No Drawing. Original application Feb. 8, 1960, Ser. No. 7,098, now Patent No. 3,105,054, dated Sept. 24, 1963. Divided and this application Mar. 22, 1962, Ser. No. 195,350
4 Claims. (Cl. 252—59)

This is a divisional of the parent application Serial No. 7,098, filed February 8, 1960 (now Patent Number 3,105,-054, issued September 24, 1963).

This invention relates to new compounds useful as thickening agents. They are polymers prepared by condensing monomers having the formula:

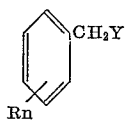

wherein R is an alkyl, aryl or cycloalkyl substituent, Y is a halogen and $n$ is a number from 1 to 4 inclusive.

Thickening agents are admixed with lubricating oils to increase their viscosity at high temperatures. Frequently, lubricants which have an adequate viscosity at ambient temperatures become too thin to provide good lubricating action as the temperature of the moving parts increases. The addition of a suitable thickening agent should not materially affect the pour point of the lubricant and should produce a composition having more body at higher temperatures. Thickening agents available now are generally insufficiently stable at high temperatures or are ineffective unless a large amount is used.

It has been discovered that polymers having the formula:

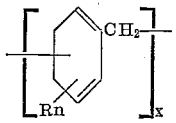

are thermally stable compositions which exhibit good thickening action in lubricants. In the formula above R is an alkyl, cycloalkyl, aralkyl, or aryl group and $n$ is an integer from 1 to 4 inclusive. The combined carbon atoms of all of the R groups should total less than about 40. Suitable groups include methyl, ethyl, pentyl, heptyl, phenyl, cyclohexyl, methylphenyl, etc. The value of $x$ in the formula can be from 30 to 500 corresponding to a molecular weight range of from about 3,000 to about 350,000. These substances are useful when mixed with a lubricant to the extent of about 5% to 40% by weight based on the weight of the mixture. They can be used in various mineral oils as well as in silane fluids. The latter have been proposed as high temperature lubricants because of their excellent stability.

The polymers are easily prepared from monomers having the formula:

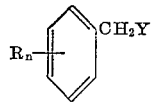

wherein $R_n$ has the same designation as in the polymer and $y$ is a halogen, which may be bromine or iodine but is generally chlorine. This monomer is dissolved in a solvent such as petroleum ether, cyclohexane or carbon disulfide and a small amount of a metallic Friedel-Crafts catalyst is added. The preferred catalysts are ferric, aluminum and stannic chlorides, although others of the type mentioned can also be used. The catalyst to monomer ratio should be between about one part by weight catalyst to about 5 to 20 parts by weight of the monomer. In order to avoid the formation of insoluble polymers, cross-linking must be avoided. This is best accomplished by slow addition of the catalyst, i.e. a slow polymerization rate, by using a mild catalyst such as hydrated ferric chloride or by using monomers in which all of most of the 4 available positions are substituted with any of the various alkyl, cycloalkyl, aryl or aralkyl groups.

In order to separate the polymer from the reaction mixture the solvent is distilled away, the residue is admixed with water or a dilute aqueous mineral acid, such as hydrochloric, and a solvent for the polymer such as benzene or toluene, for example. The acid dissolves the catalyst and its decomposition products while the solvent dissolves the polymer. Based on the weight of the residue after stripping off the reaction solvent, about 1 to 10 parts by weight of about a 5% to 20% aqueous acid solution or water and about 4 to 20 parts by weight of the solvent are generally adequate. After thorough mixing, the aqueous layer is separated and the polymer solution is washed. The washing can be done with water or a dilute base in order to remove any acid and salts which may be present. After decanting the polymer solution from the final wash, the solvent is removed by distillation to leave the solid polymer, generally in the form of a clear, brittle material.

The polymer is incorporated in the lubricant by dissolving the polymer therein at atmospheric temperatures or, preferably, at slightly elevated temperatures. Alternatively the polymer is incorporated in the lubricant by mixing the latter with a solution of the polymer in a solvent, for example, benzene or toluene, in which the lubricant is also soluble and stripping the solvent from the mixture, for example, by distillation.

The polymeric products described herein are generally effective in thickening oils of lubricating viscosity and are especially effective, in contrast to thickeners known to the prior art, at temperatures of 400 to 700° F. Furthermore, they retain their thickening power for long periods at these temperatures. Most of the previously known thickeners lack thickening power at such elevated temperatures or quickly decompose and lose their thickening effect.

By the term, oil of lubricating viscosity, it is intended to include the mineral oils derived from petroleum having paraffinic, naphthenic or mixed bases, including the natural and the refined, e.g., solvent treated oils having a viscosity sufficient to provide lubricating properties, that is, at least the viscosity of a gas oil. Also included are synthetic oils having at least such viscosity, including esters and especially the thermally very stable tetra-alkyl silanes and mixed alkyl aryl silanes having a molecular weight of about 450 or more.

A known method for polymerizing the monomers used in this invention, to produce a different type of polymer, involves pyrolysis. Thus, by heating monomers, such as p-bromomethyltoluene, to temperatures of 500° to 800° C., polymers are produced which contain a considerable proportion of halogen and ethylenic unsaturation. Such polymers are not suitable as thickeners for lubricating oils because the unsaturation is unstable to oxidation and the halogen will probably cause them to be insufficiently soluble in the lubricants. The polymers of this invention contain substantially no ethylenic unsaturaton nor halogen.

The following examples illustrate the preparation and use of these polymers:

*Example 1*

Ten grams of 2-chloromethyl-4-isopropyltoluene was dissolved in 25 milliliters of carbon disulfide. To this solution was added 1.2 grams of stannic chloride and the mixture was refluxed for 8 hours. After this, the carbon disulfide was distilled off and the residue was admixed with 50 milliliters of 10% hydrochloric acid and 150 milliliters of benzene. To facilitate complete solution of the polymer 50 milliliters of acetone was also added to the mixture. The resulting solution was washed by shaking and decanting once with 50 milliliters of water, twice with 50 milliliters each time of 5% sodium bicarbonate and once again with 50 milliliters of water. The molecular weight of the polymer, after stripping off the solvents and vacuum drying, was about 5,000.

Four grams of the polymer prepared above was admixed with 16 grams of diphenyl-di-n-dodecylsilane. The viscosity of the solution was 22.80 centistokes at 210° F. and 3.96 centistokes at 400° F. At these temperatures, the pure silane has a viscosity of 6.25 centistokes and 1.6 centistokes respectively. Thus a considerable increase in viscosity is obtainable by using the polymers of this invention. The polymer-silane solution was heated to 500° F. and maintained at this temperature for 48 hours. When cooled to 210° F. it had a viscosity of 22.78 centistokes. A loss of only 0.02 centistoke after 48 hours at 500° F. demonstrates the excellent thermal stability of the polymer.

*Example 2*

In order to compare the effectiveness of a typical polymer of this invention with a commercially used thickener (a naphthenic oil having an average molecular weight of about 1600 and sold under the name Kendex), they were separately dissolved in diphenyl-di-n-dodecyl silane. The viscosity of the pure silane at 700° F. was 0.65 centistoke. Polymerized 2-chloromethyl-4-isopropyltoluene was prepared by treating 20 grams of the monomer with 2.5 grams of ferric chloride in 20 milliliters of cyclohexane and then filtering and washing the product with dilute HCl, water and finally dilute sodium bicarbonate. The addition of 7% by weight of this polymer to the silane increased the viscosity over 15% to 0.75 centistoke. In order to attain this same increase with Kendex, it was necessary to add 30% by weight thereof, over 4 times as much as was required of the polymer of this invention.

*Example 3*

Twenty grams of 2 - chloromethyl-4 - isopropyltoluene was dissolved in 50 milliliters of carbon disulfide. It was stirred and refluxed for eight hours with 2.5 grams of pulverized ferric chloride. The reaction mixture was stripped, and diluted with 50 milliliters of 10% hydrochloric acid and 150 milliliters of benzene. The benzene phase was washed with 100 milliliters of water, three 100 milliliter portions of 5% sodium bicarbonate and 100 milliliters of water. It was dried over sodium sulfate, and filtered into a 250 milliliter beaker. It was stripped at 185° C./15 mm. in a vaccum oven. The hard, brittle residue, weighing 12 grams, was powdered and its molecular weight, determined cryoscopically, was about 4000. It was suitable for use as a thickener in lubricating oils.

*Example 4*

Twenty grams of 2 - chloromethyl-4 - isopropyltoluene, dissolved in 50 milliliters of carbon disulfide was cooled to 0° C. A 2.5 gram portion of ferric chloride was added and the mixture was stirred at 0° C. for four hours. It was warmed slowly to room temperature and stood for three days. Then it was stirred under reflux for eight hours. The carbon disulfide was distilled off and the residue was dissolved in a mixture of 50 milliliters of 10% hydrochloric acid and 150 milliliters of benzene. The layers were separated and the organic phase was washed with 100 milliliters of water, three 100 milliliter portions of 5% sodium bicarbonate solution, and 100 milliliters of water. The solution was dried over potassium carbonate, filtered and stripped to give 10 grams of brittle, dark resin suitable for use as a lubricating oil thickener.

*Example 5*

Ten grams of 2-chloromethyl-4-isopropyltoluene dissolved in 50 milliliters of carbon disulfide was stirred at reflux with 2.5 grams of ferric chloride. After one hour, 20 more grams of 2-chloromethyl-4-isopropyltoluene was added to the reaction flask over a period of two hours. After refluxing five hours, it was allowed to stand overnight and then it was refluxed for another eight hours. The solvent was removed in vacuo. The organic phase was washed with 75 milliliters of water, three 75 milliliters portions of 5% sodium bicarbonate, and again with 75 milliliters of water. It was dried over anhydrous potassium carbonate, filtered and stripped, leaving approximately 15 grams of resin which was suitable for use as an oil thickener.

*Example 6*

Twenty grams of 2 - chloromethyl-4 - isopropyltoluene dissolved in 50 milliliters of petroleum ether was stirred for thirty minutes at 0° C. with 0.5 grams of aluminum chloride granules. Then, another 1.5 grams of aluminum chloride was added, and stirring in an ice bath was continued for three hours, letting it then warm to room temperature. After standing overnight, it was stirred for eight hours at gentle reflux. It was partially stripped in vacuo, and then 100 milliliters of benzene and 50 milliliters of 10% hydrochloric acid were added. The organic layer was washed with 100 milliliters of water, three 100 milliliter portions of 5% sodium bicarbonate, and 100 milliliters of water. It was dried over potassium carbonate, filtered, and stripped to give a brittle resin suitable for use as an oil thickener.

*Example 7*

A glass flask equipped with a stirrer was charged with 40 grams of 2-chloromethyl-4-isopropyltoluene, 100 milliliters of cyclohexane and 5 grams of ferric chloride hexahydrate. The flask was placed in a water bath and the contents were maintained at 81° to 94° C. for 24 hours, after which they were refluxed for 2 hours. The reaction product was diluted with about 250 milliliters of benzene and filtered. In a separatory funnel, the product was shaken with 50 milliliters of 10% aqueous sodium hydroxide followed by several washings with hot water. The oil layer was then filtered and the solvents were distilled therefrom. When the product was dissolved in diphenyl-di-n-dodecylsilane to the extent of 15% by weight, the mixture showed a viscosity of 34.3 centistokes at 210° F. The pure silane has a viscosity of 6.25 centistokes at this temperature. Analysis showed the chlorine content of the polymer to be 0.25% by weight.

*Example 8*

Ten grams of chloromethyl tetraethylbenzene were stirred with 10 milliliters of cyclohexane and 1.25 grams of ferric chloride hexahydrate for 24 hours. The temperature was maintained at 100° C. The yield was 86% by weight, based on the monomer, of polymer which could be used as a lubricating oil thickener.

*Example 9*

Simultaneous chloromethylation and polymerization can be done as follows. A flask equipped with a stirrer and dropping funnel, was charged with 0.5 mole of 1-phenyl-4-isopropyl benzene and 0.7 mole of paraformaldehyde. About 0.16 mole of stannic chloride was placed in the dropping funnel. A hydrogen chloride feeding tube was led into the flask below the liquid level. Stirring was begun, the flask contents were heated to 45° C. by means of a mantle, anhydrous hydrogen chloride was bubbled into the reaction mixture and dropwise addition of stannic chloride was started. The mantle was removed and the temperature of the reacting mixture was maintained at about 70° C. to 85° C. by varying the rate of addition of the stannic chloride. After one hour all of the stannic chloride was in the flask. Hydrogen chloride was bubbled in for an additional 10 minutes. After an additional heating period of 10 minutes at 70° C. the mixture cooled to room temperature and it formed a brittle resin. This was treated with hot xylene and water. The xylene phase was decanted, filtered and dried over $Na_2SO_4$ for 2 days. A sample of the dried xylene solution was dissolved in 400 milliliters of toluene and 1 milliliter of stannic chloride was added thereto. The mixture was stirred for 4 hours and allowed to stand overnight. It was washed with dilute hydrochloric acid, then three times with 10% sodium bicarbonate and then twice with water. It was stripped of solvents under vacuum and dissolved in n-octadecyl-tri-n-decylsilane to the extent of 25% by weight. The mixture had a viscosity of 30.1 centistokes at 210° F. as opposed to a viscosity of only 6.5 centistokes for the pure silane at this temperature.

*Example 10*

Forty grams of 2-chloromethyl - 4-isopropyltoluene were dissolved in 100 milliliters of cyclohexane and 5 grams of ferric chloride hexahydrate were added. The reaction mixture was heated at 81 to 94° C. for 24 hours. The water was distilled out of the reaction mixture, and, after cooling the reaction mixture to room temperature, it was diluted with about 150 milliliters of benzene and filtered. The product was shaken in a separatory funnel with 50 milliliters of 10% aqueous sodium hydroxide. It was separated from the latter and shaken with hot water several times. The oil layer was filtered and stripped of solvents to give a solid, polymeric product, whose chlorine content was 0.27% by weight.

A solution was made up containing 10% by weight of the polymer prepared according to the above description and 90% by weight of a light naphthenic mineral oil. A second solution containing 10% by weight of Kendex in same mineral oil was prepared. The viscosity of the untreated mineral oil at 100° F. was 2.8 centistokes. The oil containing 10% of the polymer of this invention has a viscosity of 7.8 centistokes at 100° F. while the oil containing the Kendex had a viscosity of only 4.4 centistokes at 100° F.

*Example 11*

The thermal stability of 2 commercial thickeners was compared with a polymer of this invention by dissolving each of them in diphenyl-di-n-dodecylsilane. The viscosity of the compositions at 210° F. was measured. The solutions were then heated at 500° F. for 48 hours and their viscosity at 210° F. was again determined.

| Diphenyl-di-n-dodecylsilane containing— | Weight percent of thickeners | Initial visc-. centistokes | Final visc-. centistokes | Percent change |
|---|---|---|---|---|
| No additive | | 6.3 | 6.4 | +1. |
| Polymerized butyl methacrylate and stearyl methacrylate | 10 | 54.0 | 11.9 | −78 |
| Polymerized butylene | 5 | 16.1 | 12.9 | −20 |
| Polymerized 2-chloromethyl-4-isopropyltoluene | 10 | 15.0 | 14.8 | −1.3 |

The commercial materials showed considerable thermal decomposition as evidenced by the decrease in viscosities of the mixtures after the heat treatment.

I claim:

1. A composition of matter comprising an oil of lubricating viscosity and 5 percent to 40 percent by weight, based on the weight of the composition, of a composition of matter having the formula:

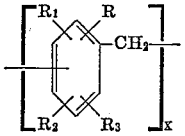

wherein R and $R_1$ are each selected from the group consisting of hydrogen and alkyl of from 1 to 8 carbon atoms, $R_2$ is selected from the group consisting of aryl of from 6 to 7 inclusive carbon atoms and alkyl of from 1 to 8 carbon atoms, $R_3$ is selected from the group consisting of hydrogen and alkyl of from 1 to 8 carbon atoms.

2. The composition of claim 1, wherein R is hydrogen, $R_1$ is hydrogen, $R_2$ is isopropyl and $R_3$ is methyl.

3. The composition of claim 1, wherein R, $R_1$, $R_2$ and $R_3$ are each ethyl.

4. The composition of claim 1, wherein R is hydrogen, $R_1$ is hydrogen, $R_2$ is phenyl, and $R_3$ is isopropyl.

References Cited by the Examiner

UNITED STATES PATENTS

| | | | |
|---|---|---|---|
| 2,836,571 | 5/58 | Hall | 260—2 |
| 2,870,098 | 1/59 | Martin et al. | 260—2 |
| 2,914,489 | 11/59 | Hall | 260—2 |
| 2,982,730 | 5/61 | Barry | 252—59 |
| 3,002,913 | 10/61 | Pino | 252—59 X |
| 3,057,801 | 10/62 | Wilgus | 252—59 |
| 3,060,122 | 10/62 | Wilgus | 252—59 |
| 3,066,101 | 11/62 | Wilgus | 252—59 |

DANIEL E. WYMAN, *Primary Examiner.*

JULIUS GREENWALD, *Examiner.*

UNITED STATES PATENT OFFICE
CERTIFICATE OF CORRECTION

Patent No. 3,203,898　　　　　　　　　　　　　　　　August 31, 1965

Edward E. Harris

It is hereby certified that error appears in the above numbered patent requiring correction and that the said Letters Patent should read as corrected below.

Column 1, lines 40 to 45, the formula should appear as shown below instead of as in the patent:

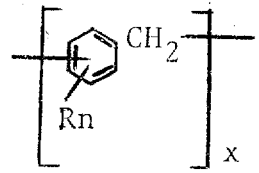

Signed and sealed this 20th day of September 1966.

(SEAL)
Attest:

ERNEST W. SWIDER
Attesting Officer

EDWARD J. BRENNER
Commissioner of Patents